United States Patent [19]
Schmitt

[11] Patent Number: 5,350,570
[45] Date of Patent: Sep. 27, 1994

[54] SYNTHESIS OF CRYSTALLINE ZSM-18
[75] Inventor: Kirk D. Schmitt, Pennington, N.J.
[73] Assignee: Mobil Oil Corp., Fairfax, Va.
[21] Appl. No.: 128,170
[22] Filed: Sep. 29, 1993
[51] Int. Cl.[5] ............................................. C01B 33/34
[52] U.S. Cl. .................................. 423/705; 423/709; 423/718
[58] Field of Search ............... 423/701, 702, 704, 705, 423/709, 718; 502/62, 71, 77

[56] References Cited

U.S. PATENT DOCUMENTS

| | | | |
|---|---|---|---|
| 3,950,496 | 4/1976 | Ciric | 423/706 |
| 4,021,502 | 5/1977 | Plank et al. | 585/533 |
| 4,851,200 | 7/1989 | Ryan | 423/715 |
| 5,290,534 | 3/1994 | Tsao | 423/704 |

OTHER PUBLICATIONS

Lok, B. M., "The role of organic molecules in molecular sieve synthesis", Zeolites, vol. 3, 282–291 (no month).
Lawton, S. L. et al., "The Framework Topology of ZSM-18, a Novel Zeolite Containing Rings of Three (Si, Al)–O Species", Science, vol. 247, 1319–1322 (Mar. 1990).
Ciric, J. et al., "Synthesis and Crystal Structure of 2,3,4,5,6,7,8,9-Octahydro-2,2,5,5,8,8-hexamethyl-1-H-benzo[1,2-c:3,4-c':5,6-c'']tripyrrolium Tribromide Dihydrate, $C_{18}H_{30}N_3^{3+} \cdot 3Br^- - 2H_2O^1$", Journal of the American Chemical Society, 100, 2173–2175, (1978), (no month).

*Primary Examiner*—Mark L. Bell
*Assistant Examiner*—David Sample
*Attorney, Agent, or Firm*—Alexander J. McKillop; Malcolm D. Keen; Dennis P. Santini

[57] ABSTRACT

This invention relates to a new form of crystalline material identified as having the structure of ZSM-18, to a new and useful method for synthesizing said crystalline material and to use of said crystalline material prepared in accordance herewith as a catalyst for organic compound, e.g., hydrocarbon compound, conversion.

16 Claims, 1 Drawing Sheet

SYNTHESIS OF CRYSTALLINE ZSM-18

BACKGROUND OF THE INVENTION

1. Field of the Invention

This invention relates to a new method for synthesizing a highly useful form of crystalline material identified as having a ZSM-18 structure, the new ZSM-18 synthesized, and use of the crystalline material synthesized in accordance herewith as a catalyst component for organic compound, e.g., hydrocarbon compound, conversion.

More particularly, this invention relates to a method for preparing the crystalline ZSM-18 structure whereby synthesis is facilitated and reproducible and the product exhibits high purity and catalytic utility.

2. Discussion of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of large dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are crosslinked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This balanced electrovalence can be expressed by a formula wherein the ratio of aluminum to the number of various cations, such as Ca/2, Sr/2, Na, K, or Li is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. These zeolites have come to be designated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); and zeolite ZSM-12 (U.S. Pat. No. 3,832,449), merely to name a few.

Although the term "zeolites" encompasses materials containing silica and alumina, it is recognized that the silica and alumina portions may be replaced in whole or in part with other oxides. More particularly, $GeO_2$ is an art-recognized substitute for $SiO_2$. Also, $B_2O_3$, $Cr_2O_3$, $Fe_2O_3$, and $Ga_2O_3$ are art-recognized replacements for $Al_2O_3$. Accordingly, the term "zeolite" as used herein shall connote not only materials containing silicon and, optionally, aluminum atoms in the crystalline lattice structure thereof, but also materials which contain suitable replacement atoms for such silicon and/or aluminum. On the other hand, the term "aluminosilicate zeolite" as used herein shall define zeolite materials consisting essentially of silicon and aluminum atoms in the crystalline lattice structure thereof, as opposed to materials which contain substantial amounts of suitable replacement atoms for such silicon and/or aluminum.

Although certain zeolites can be prepared from totally inorganic reaction mixtures, the synthesis of other zeolites is often promoted or made possible by the inclusion of certain organic compounds, termed "organic directing agents", in the reaction mixture. Note the article by Lok et al., "The Role of Organic Molecules in Molecular Sieve Synthesis," *Zeolites* 3, 282–291 (1983). When such organic directing agents are used, they may be included in an aqueous reaction mixture containing reactants, e.g., sources of silica and alumina, necessary for the zeolite synthesis. The reaction mixture may then be maintained under sufficient conditions, e.g., at elevated temperature, until the desired crystals are formed. These crystals may then be recovered by filtration and washing the filtered crystals with water. This filtering and washing treatment separates the crystals from organic directing which is either included in the mother liquor of the reaction mixture or loosely associated with the exterior surface of the crystals. However, a residue of the organic directing agent, e.g., amines and especially quaternary ammonium compounds, usually remains more tenaciously attached to the zeolite crystals. This tenaciously-attached residue, which is not removed by the filtering and washing treatment, may be occluded within the pores of the zeolite and/or firmly affixed to the surface of the zeolite. Certain residues which are tenaciously attached to the zeolite may occupy cation exchange sites of the zeolite, especially in the case of quaternary ammonium residues. It is particularly important to remove organic residue which occludes in the pores of the zeolite because this type of residue may constitute obstructions which tend to substantially reduce the sorption capacity and catalytic activity of the zeolite.

In order to remove the residue of organic directing agents from as-synthesized zeolites, which residue cannot be readily removed by filtration and washing, the zeolite may be calcined at elevated temperatures, such as about 400° C. or higher, in the presence of a source of oxygen such as air for at least one hour. This calcination treatment promotes the decomposition and/or volatilization of the residue. The presence of oxygen during the calcination further promotes oxidation, e.g., combustion, of the organic residue into oxidized species, e.g., carbon dioxide, carbon monoxide, water, and nitrogen oxides, which are evolved as gases.

The above-mentioned calcination procedure is effective for removing organic directing agent residue from as-synthesized zeolites which are stable under the required conditions. However, certain as-synthesized zeolites tend to undergo a phase transformation, e.g., to a different crystalline form or to an amorphous material, under these conditions. One such zeolite is ZSM-18, especially species of ZSM-18 which have a low silica to alumina molar ratio. U.S. Pat. No. 3,950,496, the entire disclosure of which is expressly incorporated herein by reference, describes ZSM-18 and the synthesis thereof. Example 6 of U.S. Pat. No. 3,950,496 points out that when the as-synthesized form of ZSM-18, prepared from a reaction mixture having a silica to alumina molar ratio of 9.0, was calcined at 1000° F. in air for 3 hours, the zeolite was substantially reduced to the amorphous state.

Conventional synthesis of ZSM-18 comprises heating an aqueous solution of a mixture of oxides, i.e., $Na_2O$, $Al_2O_3$, $SiO_2$, $H_2O$, and T, wherein T represents a particular tris-quaternary ammonium hydroxide. The structure and synthesis of tris-quaternary ammonium bromide, "triquat tribromide dihydrate", identified as 2,3,4,5,6,7,8,9-octahydro-2,2,5,5,8,8,-hexamethyl-1H-benzo{1,2-c:3,4-c':5,6-c"}tripyrrolium tribromide dihydrate, said to direct synthesis of ZSM-18, is taught in *J. Am. Chem. Soc.*, 100, 2173–2175 (1978). The structure of the tris-quaternary ammonium cation, i.e., "triquat", is represented as follows:

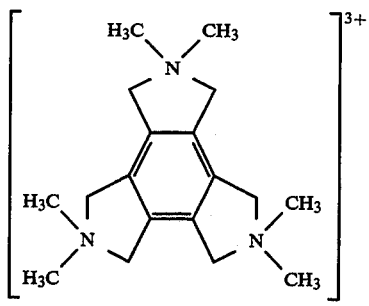

The framework topology of ZSM-18 is described by Lawton et al. in *Science* 247, 1319–1322 (1990), incorporated entirely herein by reference. They described ZSM-18 as the first known aluminosilicate zeolite containing rings of three (Si,Al)—O species. The channel structure of ZSM-18 is characterized by linear, unidimensional, 12-membered ring channels with approximate pore openings of 7 Angstroms. These channels are said to be lined with pockets which are capped by 7-membered rings with dimensions of 2.8×3.5 Angstroms. Lawton et al. declare that their work suggests a strong templating effect may be responsible for the formation of the unusual ZSM-18 structure.

An effort to remove the organic residue from ZSM-18 resulting from triquat (1) lead to U.S. Pat. No. 4,851,200. The three-step method involves contacting the as-synthesized zeolite with an aqueous solution of a fluorosilicate salt such as ammonium fluorosilicate, ion-exchanging the zeolite with an alkali metal or alkaline earth metal salt such as KCl, and then calcining the ion-exchanged zeolite.

Applicants know of no prior art method for preparing a crystalline structure identified as ZSM-18 utilizing the present method.

SUMMARY OF THE INVENTION

An economical and reproducible method for preparing stable crystalline material identified as ZSM-18 exhibiting high catalytic activity and other valuable properties is provided. The method comprises forming a reaction mixture hydrogel containing sources of alkali metal (M) cations, preferably $Na^+$; an oxide of trivalent element (X), e.g., aluminum, boron, iron, gallium, indium and mixtures thereof; an oxide of tetravalent element (Y), e.g., silicon, germanium, tin and mixtures thereof; an organic directing agent (T), more particularly described as triquat (2) hereinafter; and water, said reaction mixture having a composition in terms of mole ratios, within the following ranges:

| Reactants | Useful | Preferred |
|---|---|---|
| $YO_2/X_2O_3$ | 10 to 30 | 15 to 18 |
| $H_2O/YO_2$ | 10 to 100 | 20 to 60 |
| $OH^-/YO_2$ | 0.10 to 0.80 | 0.3 to 0.5 |
| $M/YO_2$ | 0.00 to 0.50 | 0.05 to 0.20 |
| $T/YO_2$ | 0.03 to 0.30 | 0.04 to 0.18 |

The method further comprises maintaining the reaction mixture until crystals of ZSM-18 structure are formed. Reaction conditions required consist of heating the foregoing reaction mixture to a temperature of from about 80° C. to about 150° C. for a period of time of from about 24 hours to about 150 days. A more preferred temperature range is from about 110° C. to about 140° C. with the amount of time at a temperature in such range being from about 48 hours to about 40 days. The solid product comprising ZSM-18 crystals is recovered from the reaction medium, as by cooling the whole to room temperature, filtering and water washing.

EMBODIMENTS

Figure 1:
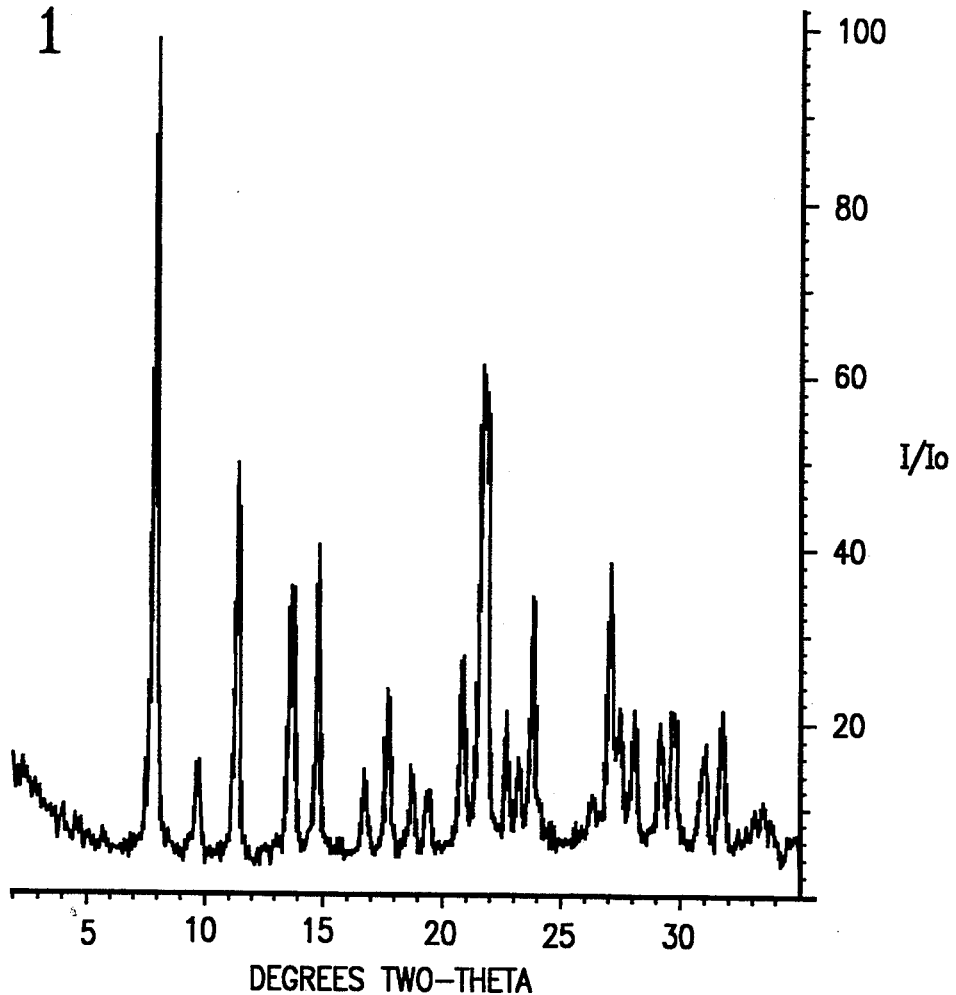
FIG. 1 presents the X-ray powder diffraction pattern of the calcined product of Example 3, hereinafter presented.

The different triquat directing agent (T) required for use herein has a formula $C_{15}H_{39}N_4^{+++}$, and may be represented as follows:

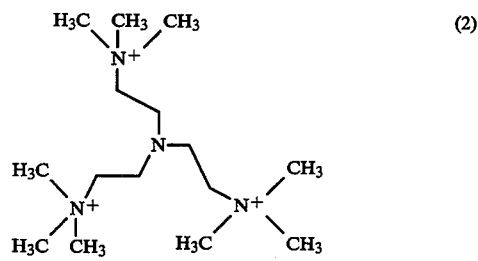

The source of the directing agent may be, for example, the halide, e.g., chloride or bromide, salt. Triquat (2) was synthesized for use herein, as follows:

A 500 mL Parr autoclave was charged with 25 g $(ClCH_2CH_2)_3N.HCl$ (Aldrich) and 250 mL MeOH, sealed, cooled in Dry Ice and evacuated to <2 Torr when 50 g $Me_3N$ (anhydrous gas, Aldrich) were run in from an inverted cylinder. The mixture was warmed to room temperature in a water bath, then at 5° C./minute to 92° C., held 7 hours at 92° C., cooled to room temperature, filtered and stripped to give a white paste, The yield of tris-quaternary at this point was 100% with no impurities visible to C-nmr except that the HCl in the original salt had trapped one mole/mole of $Me_3N$ as its hydrochloride. The product was dissolved in 700 mL $H_2O$, eluted over 1 hour through 700 mL IRA-100 anion exchange resin and stripped to about 200 mL on a rotary evaporator. Stripping removed the $Me_3N$. Generally, enough H$_2$O was stripped to give a 1.15–1.3N (0.38–0.43M in triquat (2)) solution. Titration of the base gave 94–98% yield of a product whose C-nmr showed only the expected peaks at 64.7 (triplet), 55.7 (triplet), and 48.9 vs. DSS in D$_2$O. The product was crystallized from water in low yield as the tetradecahydrate as indicated by elemental analysis and proton nmr.

The particular effectiveness of the presently required organic directing agent, i.e., triquat (2), when compared with any other directing agent, except for triquat (1) above, for the present synthesis is believed due to its ability to function as a template in the nucleation and growth of ZSM-18 crystals from the above reaction mixture. This is true even though no predigestion of the gel is required prior to crystallization. This different organic agent functions in this fashion in the reaction mixture having the above described composition and under the above described conditions of temperature and time.

It should be noted that the ratio of components of the reaction mixture required herein are critical to achieve maximum effectiveness. For instance, if the YO$_2$/X$_2$O$_3$ ratio is less than 10, e.g., 6, something other than ZSM-18 crystal will form. As the YO$_2$/X$_2$O$_3$ ratio approaches 30 in the reaction mixture, crystallization of another crystal structure increases. Still further, for most effective synthesis of ZSM-18 by this method, the reaction temperature should be maintained within the range of from about 80° C. to about 150° C., preferably from about 110° C. to about 140° C.

The synthesis of the present invention is facilitated when the reaction mixture comprises seed crystals, such as those having the structure of ZSM-18. The use of at least 0.01%, preferably about 0.10%, and even more preferably about 1% seed crystals (based on total weight) of crystalline material will be useful.

The reaction mixture composition for the synthesis of ZSM-18 crystals hereby can be prepared utilizing materials which can supply the appropriate oxide. The useful sources of X$_2$O$_3$, e.g., aluminum oxide, iron oxide and/or boron oxide, include, as non-limiting examples, any known form of such oxide, e.g., aluminum oxide or hydroxide, organic or inorganic salt or compound, e.g., alumina, aluminates and borates. The useful sources of YO$_2$, e.g., silicon oxide, include, as non-limiting examples, known forms of such oxide, e.g., silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the ZSM-18 crystals may vary somewhat with the exact nature of the reaction mixture employed within the above limitations.

The ZSM-18 crystal composition prepared hereby has a characteristic X-ray diffraction pattern, including values substantially as set forth in Table I, hereinafter.

TABLE I

| Interplanar d-Spacing, (A) | Relative Intensity (I/I$_o$) |
|---|---|
| 11.5 ± .26 | VS |
| 9.3 ± .20 | W |
| 7.9 ± .16 | M-S |
| 6.6 ± .14 | M |

TABLE I-continued

| Interplanar d-Spacing, (A) | Relative Intensity (I/I$_o$) |
|---|---|
| 5.1 ± .11 | M |
| 4.8 ± .10 | W |
| 4.64 ± .10 | W |
| 4.34 ± .09 | M |
| 4.18 ± .09 | VS |
| 3.97 ± .08 | S |
| 3.88 ± .08 | M |
| 3.80 ± .08 | S |
| 3.31 ± .07 | M |
| 3.24 ± .07 | M |
| 3.13 ± .065 | W |
| 3.06 ± .06 | M |
| 2.87 ± .06 | M |
| 2.50 ± .05 | W |

These X-ray diffraction data were collected with a Scintag theta-theta powder diffraction system, equipped with a graphite diffracted beam monochromator and scintillation counter, using copper K-alpha radiation. The diffraction data were recorded by step-scanning at 0.07 degrees of two-theta, where theta is the Bragg angle, and a counting time of 4 seconds for each step. The interplanar spacings, d's, were calculated in Angstrom units (A), and the relative intensities of the lines, I/I$_o$, where I$_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols VS=very strong (60–100), S=strong (40–60), M=medium (20–40), W=weak (10–20) and VW=very weak (0–10). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline ZSM-18 prepared hereby has a composition involving the molar relationship:

X$_2$O$_3$:(y)YO$_2$ wherein X is a trivalent element, such as aluminum, boron, iron, indium and/or gallium, preferably aluminum; Y is a tetravalent element, such as silicon, tin and/or germanium, preferably silicon; and y is from about 10 to about 30, usually from about 15 to about 18. In the as-synthesized form, the crystalline material has a formula, on an anhydrous basis and in terms of moles of oxides per y moles of YO$_2$, as follows:

(0.00 to 0.02)M$_2$O:(0.03 to 0.08)T:X$_2$O$_3$:(y)YO$_2$ wherein M and T are as defined above. The M and T components are associated with the material as a result of their presence during crystallization, and are easily removed by post-crystallization methods hereinafter more particularly described.

Reasons for little having been accomplished with ZSM-18 since its invention by Ciric (U.S. Pat. No. 3,950,496 hereinabove incorporated herein by reference) include the need, until the present invention, for one specific organic directing agent to synthesize it, i.e. triquat (1) above, the complexity and cost of triquat (1) manufacture, and, most of all, the virtual impossibility of removing triquat (1) from as-synthesized ZSM-18 without destroying the zeolite structure. Synthesis of triquat (1) is complex, with low yields, and has a photochemical bromination step if the bromide is desired. As exemplified hereinafter and learned by those skilled in the art, attempts to remove triquat (1) from the ZSM-18 structure destroys the crystal structure.

The present invention provides a ZSM-18 synthesis with distinct advantages over use of the complicated and costly series of exchanges and calcinations taught by U.S. Pat. No. 4,851,200, referred to above. First, triquat (2) is easy to manufacture in large quantities. It is available in a one-step synthesis from a fine chemical, i.e., tris(chloroethylamine) hydrochloride, as follows:

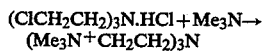
$(ClCH_2CH_2)_3N\cdot HCl + Me_3N \rightarrow$
$(Me_3N^+CH_2CH_2)_3N$

Tris(chloroethylamine) hydrochloride is available from commodity chemicals as follows:

$N(CH_2CH_2OH)_3 + SOCl_2 \rightarrow (ClCH_2CH_2)_3N\cdot HCl$

Second, triquat (2) may be easily and routinely removed from the ZSM-18 structure to form the porous, hydrogen-form of the zeolite necessary for catalytic applications. This is not possible when triquat (1) is used to direct synthesis of ZSM-18.

Synthetic ZSM-18 crystals prepared in accordance herewith can be used in the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-18 such as, for example, by, in the case of platinum, treating the material with a platinum metal-containing ion. Suitable platinum compounds for this purpose include chloroplatinic acid, platinum chloride and various compounds containing the platinum amine complex. Combinations of metals and methods for their introduction can also be used.

Synthetic ZSM-18 crystals, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The crystalline thermal decomposition product of the newly synthesized ZSM-18 can be prepared by heating same at a temperature of from about 200° C. to about 550° C. for from 1 hour to about 48 hours.

The original cations, e.g., alkali metal, of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB, and VIII of the Periodic Table of the Elements, especially gallium, indium, and tin.

Typical ion exchange technique would be to contact the synthetic ZSM-18 material with a salt of the desired replacing cation or cations. Examples of such salts include the halides, e.g., chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-18 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active crystalline thermal decomposition product thereof.

The crystalline ZSM-18 prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline material can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g., alumina, titania and/or zirconia. The latter may be either naturally occurring or in the form of gelatinous precipitates, sols or gels including mixtures of silica and metal oxides. Use of a material in conjunction with the ZSM-18, i.e., combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g., bentonite and kaolin. These materials, i.e., clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalytically active form of the catalyst of this invention which may contain additional hydrogenation components, reforming stocks can be reformed employing a temperature between about 370° C. and about 540° C. The pressure can be between about 100 psig and about 1000 psig, but it is preferably between about 200 psig and about 700 psig. The liquid hourly space velocity is generally between about 0.1 and about 10 hr$^{-1}$, preferably between about 0.5 and about 4 hr$^{-1}$, and the hydrogen to hydrocarbon mole ratio is generally between about 1 and about 20, preferably between about 4 and about 12.

The catalyst can also be used for hydroisomerization of normal paraffins, when provided with a hydrogenation component, e.g., platinum. Hydroisomerization is carried out at a temperature between about 90° C. and 375° C., preferably about 145° C. to about 290° C., with a liquid hourly space velocity between about 0.01 and about 2 hr$^{-1}$, preferably between about 0.25 and about 0.50 hr$^{-1}$, employing hydrogen such that the hydrogen to hydrocarbon mole ratio is between about 1:1 and about 5:1.

The catalyst can also be used for reducing the pour point of gas oils. This reaction may be conducted at a liquid hourly space velocity between about 10 and about 30 hr$^{-1}$ and at a temperature between about 400° C. and about 540° C.

Other reactions which can be accomplished employing the catalyst of this invention containing a metal, e.g., platinum, include hydrogenation-dehydrogenation reactions and desulfurization reactions.

In order to more fully illustrate the nature of the invention and the manner of practicing same, the following examples are presented.

EXAMPLES 1–4

In these experiments, 2.77 g sodium aluminate (Na: 23.33%; Al:18.99%) were dissolved with vigorous magnetic stirring in 54 mL water and 62 mL 1.16N tris-quaternary in a beaker. When all the NaAlO$_2$ had dissolved, 26.2 mL (27.0 g) (MeO)$_4$Si were poured in all at once and the resulting gel spooned into a stainless steel autoclave liner and heated with ~300 RPM stirring for 21 days at 125° C. If the reaction was seeded, it was seeded just before the addition of the (MeO)$_4$Si with 100 mg ZSM-18 seeds. The reaction product was filtered, washed with 300 mL room temperature water, dried under an IR lamp and, except for the product of Example 4, calcined in a 0.2–0.4 cm deep bed in a quartz tube using the following program: heating at 2° C./minute to 500° C., holding for 3 hours under N$_2$, cooling to 250° C., switching to dry air, heating at 2° C./minute to 500° C., holding for 7 hours, then cooling to room temperature.

The preparation using tris-quaternary (1) was amorphous after this calcination; all preparations using triquat (2), i.e., made in accordance with this invention, had unchanged crystallinity after this calcination. The yield of calcined product from triquat (2) was 8.0–8.5 g (~80% yield based on silicon). Elemental analyses for the seeded preparation were: C, 12.57%; H, 3.64%; Al, 3.99%; N, 3.92%; Na, 0.16%; Si, 27.64%.

Table II presents these examples for ease of comparison.

TABLE II

| Example | Triquat | SiO$_2$/Al$_2$O$_3$ | H$_2$O/SiO$_2$ | OH$^-$/SiO$_2$ | Na$^+$/SiO$_2$ | T/SiO$_2$ | Seeds | Calcined Product |
|---|---|---|---|---|---|---|---|---|
| 1 | 1 | 16.2 | 32 | 0.41 | 0.12 | 0.14 | none | amorphous |
| 2 | 2 | 16.2 | 32 | 0.41 | 0.12 | 0.14 | none | crystalline |
| 3 | 2 | 14.3 | 33 | 0.40 | 0.15 | 0.13 | 1% | crystalline |
| 4 | 2 | 14.3 | 52 | 0.38 | 0.14 | 0.13 | 0.5% | not calcined |

Tables III and IV present the X-ray diffraction data for the calcined products of Examples 2 and 3 following the above staged calcination. FIG. 1 shows the X-ray diffraction pattern for the calcined product of Example 3.

TABLE III*

| Interplanar d-spacing (A) | Relative Intensity |
|---|---|
| 11.26 | 100 |
| 9.17 | 16 |
| 7.83 | 68 |
| 6.51 | 43 |
| 6.03 | 34 |
| 5.03 | 25 |
| 4.76 | 12 |
| 4.61 | 12 |
| 4.27 | 20 |
| 4.11 | 59 |
| 3.94 | 19 |
| 3.85 | 9 |
| 3.77 | 24 |

*XRD only scanned to 25 degrees 2-theta

TABLE IV

| Interplanar d-spacing (A) | Relative Intensity |
|---|---|
| 11.193 | 100 |
| 9.095 | 15 |
| 7.803 | 50 |
| 6.484 | 36 |
| 5.994 | 40 |
| 5.294 | 14 |
| 5.003 | 23 |
| 4.742 | 15 |
| 4.556 | 12 |
| 4.253 | 28 |
| 4.103 | 62 |

TABLE IV-continued

| Interplanar d-spacing (Å) | Relative Intensity |
| --- | --- |
| 3.915 | 21 |
| 3.833 | 16 |
| 3.744 | 35 |
| 3.398 | 11 |
| 3.380 | 11 |
| 3.303 | 39 |
| 3.189 | 21 |
| 3.068 | 20 |
| 3.025 | 21 |
| 2.885 | 18 |
| 2.822 | 21 |
| 2.684 | 11 |

These examples demonstrate the present invention of synthesizing crystals having the structure of ZSM-18 from the required reaction mixture. When the organic directing agent T was that required in the prior art, the product ZSM-18 was rendered amorphous upon calcination as detailed above. When the organic directing agent T was that required of the present invention, i.e., the triquat (2) above, the same calcination procedure did not destroy the ZSM-18 crystals.

EXAMPLE 5

Figure 2:
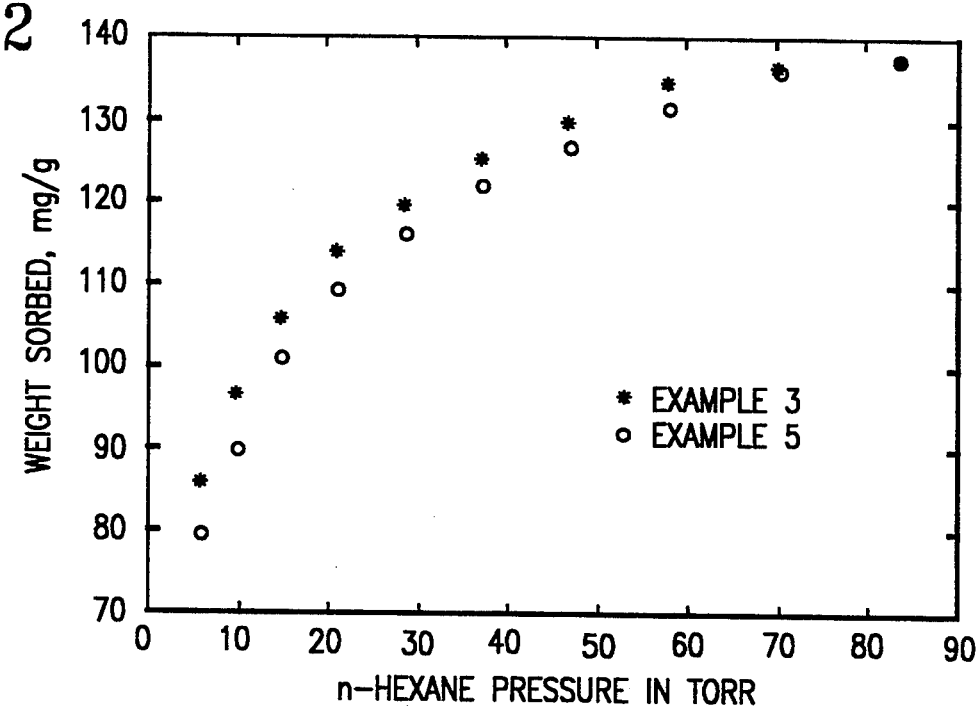
FIG. 2 presents n-hexane sorption isotherms for calcined products of Examples 3 and 5, hereinafter presented.

A sample of the product of Example 4 was calcined by heating in an open dish exposed to ambient air and moisture according to the following program: heating at 1° C./minute to 500° C., holding for 7 hours, than cooling to room temperature. There was no substantial difference between this product and that of Example 3 when n-hexane sorption isotherms were obtained at 90° C., indicating the ability of triquat (2) to promote the stability of ZSM-18. FIG. 2 presents this sorption data. Table V presents the X-ray diffraction data for the calcined product of this example.

TABLE V

| Interplanar d-spacing (Å) | Relative Intensity |
| --- | --- |
| 11.29 | 100 |
| 9.10 | 11 |
| 7.85 | 50 |
| 6.48 | 20 |
| 6.02 | 26 |
| 5.29 | 17 |
| 5.00 | 16 |
| 4.72 | 13 |
| 4.57 | 12 |
| 4.27 | 23 |
| 4.12 | 57 |
| 3.92 | 20 |
| 3.74 | 30 |
| 3.39 | 10 |
| 3.31 | 31 |
| 3.19 | 17 |
| 3.07 | 16 |
| 3.02 | 26 |
| 2.89 | 16 |
| 2.82 | 23 |
| 2.72 | 11 |

Changes and modifications in the specifically described embodiments can be carried out without departing from the scope of the invention which is intended to be limited only by the scope of the appended claims.

What is claimed is:

1. A method for synthesizing crystalline material exhibiting a characteristic X-ray diffraction pattern including d-spacing maxima values as shown in Table I, which comprises (i) preparing a mixture capable of forming said material, said mixture comprising sources of alkali metal (M), an oxide of trivalent element (X), an oxide of tetravalent element (Y), water and triquat (T) having the formula $C_{15}H_{39}N_4^{+++}$, represented as follows:

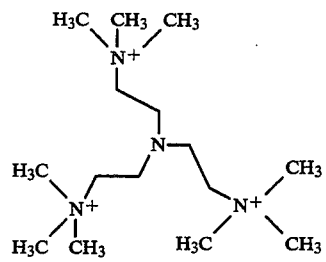

and having a composition, in terms of mole ratios, within the following ranges:

| | |
| --- | --- |
| $YO_2/X_2O_3$ | 10 to 30 |
| $H_2O/YO_2$ | 10 to 100 |
| $OH^-/YO_2$ | 0.10 to 0.80 |
| $M/YO_2$ | 0.00 to 0.50 |
| $T/YO_2$ | 0.03 to 0.30 |

(ii) maintaining said mixture under sufficient conditions including a temperature of from about 80° C. to about 150° C. until crystals of said material are formed; and (iii) recovering said crystalline material from step (ii), said recovered crystalline material containing said T.

2. The method of claim 1 wherein said mixture has the following composition ranges:

| | |
| --- | --- |
| $YO_2/X_2O_3$ | 15 to 18 |
| $H_2O/YO_2$ | 20 to 60 |
| $OH^-/YO_2$ | 0.3 to 0.5 |
| $M/YO_2$ | 0.05 to 0.20 |
| $T/YO_2$ | 0.04 to 0.18. |

3. The method of claim 1 wherein said mixture further comprises seed crystals in sufficient amount to enhance synthesis of said crystalline material.

4. The method of claim 1 wherein said X is aluminum, boron, iron, gallium, indium or a mixture thereof, and said Y is silicon, germanium, tin or a mixture thereof.

5. The method of claim 1 wherein X comprises aluminum and Y comprises silicon.

6. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

7. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

8. The method of claim 6 wherein said replacing ion is hydrogen or a hydrogen precursor.

9. The method of claim 7 wherein said replacing ion is hydrogen or a hydrogen precursor.

10. The recovered crystalline material of claim 1.

11. The recovered crystalline material of claim 2.

12. The T-containing product crystalline material of claim 6.

13. The T-containing product crystalline material of claim 7.

14. The T-containing product crystalline material of claim 8.

15. The T-containing product crystalline material of claim 9.

16. A mixture capable of forming crystals of ZSM-18 upon crystallization, said mixture comprising sources of alkali metal (M), an oxide of trivalent element (X) oxide selected from the group consisting of oxide of aluminum, boron, iron, gallium, indium and mixtures thereof; tetravalent element (Y) oxide selected from the group consisting of oxide of silicon, germanium, tin and mixtures thereof; water and triquat (T) having the formula $C_{15}H_{39}N_4^{+++}$, represented as follows:

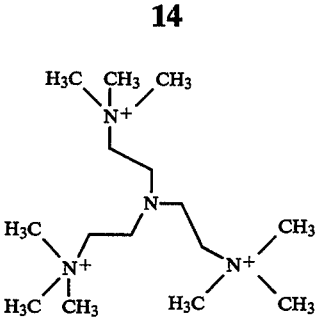

and having a composition, in terms of mole ratios, within the following ranges:

| | |
|---|---|
| $YO_2/X_2O_3$ | 10 to 30 |
| $H_2O/YO_2$ | 10 to 100 |
| $OH^-/YO_2$ | 0.10 to 0.80 |
| $M/YO_2$ | 0.00 to 0.50 |
| $T/YO_2$ | 0.03 to 0.30. |

* * * * *